United States Patent
Paczonay (10) Patent No.: US 6,273,128 B1
(45) Date of Patent: *Aug. 14, 2001

(54) APPARATUS FOR CONTROLLING THE FLOW OF FLUID

(76) Inventor: Joseph R. Paczonay, P.O. Box 1494, Fremont, CA (US) 95009

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/372,742

(22) Filed: Aug. 11, 1999

(51) Int. Cl.$^7$ ..................................... F16K 31/18
(52) U.S. Cl. ..................... 137/512.3; 137/849; 220/703
(58) Field of Search ................ 220/703; 137/512.3, 137/519.5, 849

(56) References Cited

U.S. PATENT DOCUMENTS

| | | |
|---|---|---|
| D. 350,672 | 9/1994 | Egger et al. . |
| 1,755,993 * | 4/1930 | Kelley et al. ............... 137/512.3 |
| 2,219,604 | 10/1940 | Trotter . |
| 3,424,157 | 1/1969 | Di Paolo . |
| 3,661,174 * | 5/1972 | Cripe ............................ 137/512.3 |
| 3,736,953 * | 6/1973 | Vaalburg ....................... 137/512.3 |
| 3,822,720 | 7/1974 | Souza . |
| 4,133,457 * | 1/1979 | Klassen ......................... 137/849 X |
| 4,987,740 | 1/1991 | Coleman . |
| 4,993,568 | 2/1991 | Morifuji et al. . |
| 5,060,833 | 10/1991 | Edison et al. . |
| 5,085,349 | 2/1992 | Fawcett . |
| 5,301,858 | 4/1994 | Hollander . |
| 5,307,955 | 5/1994 | Viegas . |
| 5,433,353 * | 7/1995 | Flinn ............................. 220/703 |
| 5,453,097 * | 9/1995 | Paradis ......................... 137/849 X |
| 5,553,726 | 9/1996 | Park . |
| 5,601,207 | 2/1997 | Paczonay . |
| 5,730,336 | 3/1998 | Lerner . |
| 5,743,443 | 4/1998 | Hins . |
| 5,791,510 | 8/1998 | Paczonay . |
| 5,803,121 * | 9/1998 | Estes ............................. 137/849 |
| 6,032,831 * | 3/2000 | Gardner et al. ............... 220/703 X |
| 6,070,767 * | 6/2000 | Gardner et al. ............... 220/703 X |

* cited by examiner

*Primary Examiner*—Michael Buiz
*Assistant Examiner*—Meredith H. Schoenfeld
(74) *Attorney, Agent, or Firm*—Thomas R. Lampe (57) ABSTRACT

Apparatus for controlling the flow of fluid includes a gravity sensitive valve for receiving fluid from a fluid flow passageway and a pressure activated valve located downstream from the gravity sensitive valve. The gravity sensitive valve interrupts flow of fluid when the apparatus is not in use to prevent inadvertent opening of the pressure activated valve.

28 Claims, 6 Drawing Sheets

APPARATUS FOR CONTROLLING THE FLOW OF FLUID

TECHNICAL FIELD

This invention relates to apparatus for controlling the flow of fluid. The invention has particular, but not exclusive, application to use in hydration systems for delivering liquid to the mouth of an individual, for example, a cyclist.

BACKGROUND OF THE INVENTION

A variety of orally activated valves have been developed for hydration systems and for containers. Closures for these types of applications typically incorporate a flexible, self-sealing, slit-type dispensing diaphragm valve mounted on a delivery tube or at a container outlet.

Typically, closures of this type employed on containers utilize multiple piece housings or bodies in which the valve is mounted. While closures used for such applications may function generally satisfactorily, in some applications it is desirable not to employ multiple piece constructions. Further, there is a need for an improved closure which can be more easily manufactured and assembled with reduced manufacturing costs.

In the field of hydration systems or systems for delivering liquid to the mouth of the user wherein valves are attached to delivery tubes, it would be advantageous to employ a valve that has a high flow rate but utilizes a small diameter housing that the user holds in his or her mouth. It would also be advantageous for the valve to open by the same action the user would use to drink; that is, the suction action that naturally occurs while drinking should open the valve. Then, when the user stops drinking, the valve should close. In addition, when the valve is released from the user's mouth the valve should remain closed and be in a leak tight condition; the pressure exerted by the fluid remaining in the tube should not force the valve open. The valve assembly should also prevent back flow of fluid from the valve back into the container.

As will be seen below, the apparatus disclosed and claimed herein meets these objectives. This is accomplished by employing a combination of structural elements which cooperate in a unique manner as compared to prior art approaches. These structural elements include a gravity sensitive valve in operative association with a pressure activated valve spaced a predetermined distance from the gravity sensitive valve in a fluid flow passageway.

U.S. Pat. No. 5,730,336, issued Mar. 24, 1998, discloses a bite valve with a uniform lip extending from the outlet end of the valve. The valve has a concave diaphragm facing the outlet. The diaphragm can have parallel or intersecting slits cut in it. Intersecting slits can be radially symmetrically disposed about the cylindrical axis of the valve.

U.S. Design Patent No. Des.350,672, issued Sep. 20, 1994 illustrates a valve on a container that incorporates many features disclosed in U.S. Pat. No. 5,730,336. The exit valve is formed of a cylindrical body having a uniform lip that extends from the outlet end of the valve. A curved diaphragm employed on the container or bottle is concave in the direction of the outlet and the diaphragm has two slits that intersect at the cylindrical axis of the valve.

U.S. Pat. No. 5,743,443, issued Apr. 28, 1998, discloses a valve on a container incorporating features similar to those illustrated in Des.350,672.

U.S. Pat. No. 3,822,720, issued Jul. 9, 1974, discloses a duck-bill type check valve with a single slit made of resilient material.

U.S. Pat. No. 2,219,604, issued Oct. 29, 1940, teaches a resilient valve with a single slit cut in the tip of the exit end of the valve. The area where the slit it made is at the tip of a domed or convex structure oriented toward the outlet side of the valve.

U.S. Pat. No. 5,060,833, issued Oct. 29, 1991, shows a bite valve for a hydration system employing a ball and spring arrangement with a sealing seat. The sealing seat can be on the upstream or the downstream side of the valve, but not both. The ball of the valve is disengaged from the surface of the sealing seat by deforming the body of the valve. This allows the fluid to around the ball and exit the delivery tube. This results in a relatively low fluid flow rate and requires the user to deform the external walls of the valve to cause fluid flow.

U.S. Pat. No. 5,085,349, issued Feb. 4, 1992, discloses a bite valve for a hydration system wherein the user must deform the external walls of the valve to allow fluid flow. There is the potential for the valve to leak if the sealing surfaces of the slit degrade or if the slit tears past the original cut. Also, if the user bites the valve with only his or her teeth and the user's mouth is not wrapped around the valve, fluid inside the tube can flow back into the hydration system reservoir.

My U.S. Pat. No. 5,601,207, issued Feb. 11, 1997, and U.S. Pat. No. 5,791,510, issued Aug. 11, 1998, disclose systems employing a bite valve for a hydration system where the user must deform the external walls of the valve to make fluid flow. There is the potential for the valve to leak if the sealing surfaces of the slits degrade or if the slits tear past the original cut. Also, if the user bites the valve with only his or her teeth and the user's mouth is not wrapped around the valve, fluid inside the tube can flow back into the hydration system reservoir.

U.S. Pat. No. 5,553,726, issued Sep. 10, 1996, illustrates and describes a pressure activated valve with a cross slitted flat diaphragm. The diaphragm does not open widely when suction is applied to the outlet opening and flow is restricted.

U.S. Pat. No. 3,424,157, issued Jan. 28, 1969, and U.S. Pat. No. 4,993,568 show baby bottle nipples with a slitted tip and a slitted intermediate flat diaphragm that is downstream from the exit opening. These structures have a limited flow rate and no means to prevent back flow.

U.S. Pat. No. 5,301,858, issued Apr. 12, 1994, discloses a hydration system with a mouth piece that has a one-way valve that allows fluid to flow up to the user. The valve must be deformed to allow fluid flow. The arrangement inherently has a low flow rate.

U.S. Pat. No. 4,987,740 shows a diaphragm for venting master cylinders. The valve has a diaphragm with a bellows arrangement for flexing the diaphragm. The diaphragm has a single slit in the center. The bellows and diaphragm configuration is molded of a single piece of resilient material and must be attached to the housing of the master cylinder.

Also known are prior art arrangements wherein a resilient diaphragm structure similar to that disclosed herein; however, the diaphragm is molded separately from the valve housing and considerable handling and manufacturing expenses are involved. One such arrangement is shown in U.S. Pat. No. 5,307,955, issued May 3, 1994, wherein the hinged invertible diaphragm must be molded separately from the container or the closure. The diaphragm is held in the outlet opening by press fitted hard fixtures.

Other features, advantages, and objects of the present invention will become apparent with reference to the following description and accompanying drawings.

MODES FOR CARRYING OUT THE INVENTION

Figure 1:
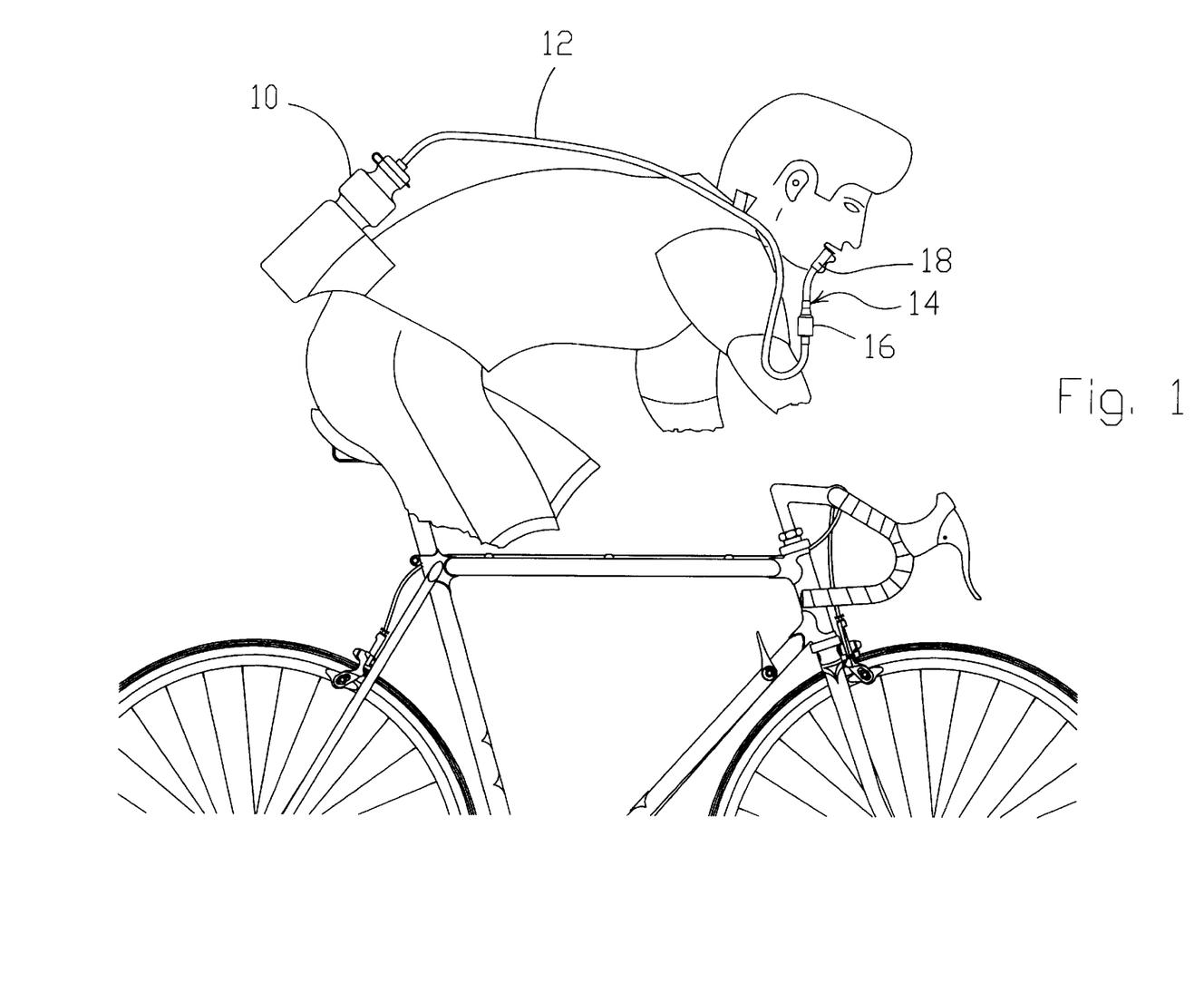
FIG. 1 is a side view of a cyclist on a bike utilizing a hydration system incorporating the apparatus of the present invention.

FIG. 1 illustrates a cyclist supporting and using a hydration system. The hydration system includes a container or bottle 10 and a delivery tube 12 extending from the bottle. Apparatus 14 constructed in accordance with the teachings of the present invention is disposed at the forward or downstream end of the delivery tube. The apparatus includes a gravity sensitive valve 16 and a pressure activated valve 18 at the discharge outlet of the hydration system which is located at the user's mouth when providing liquid to the user.

Figure 2:
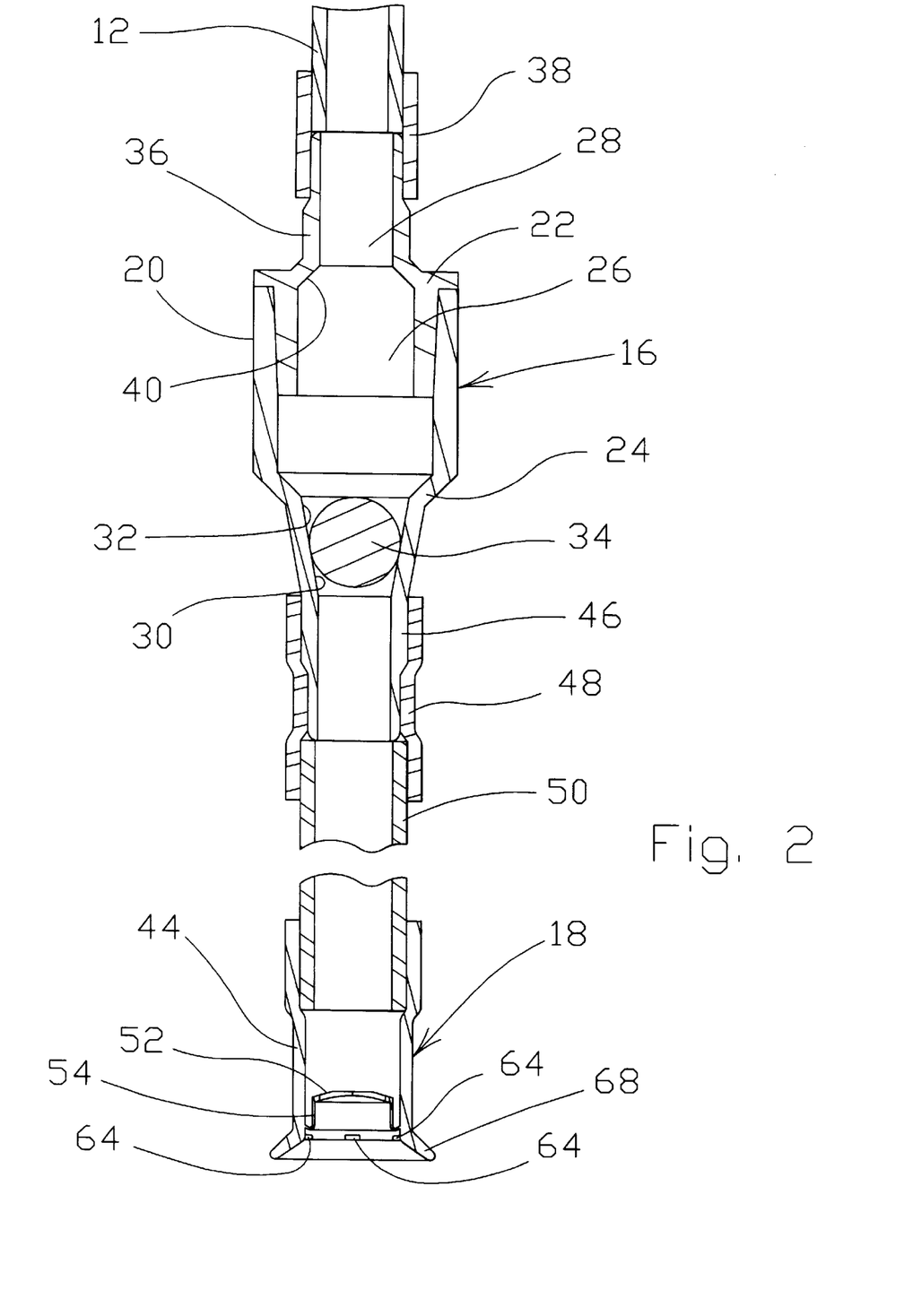
FIG. 2 is a greatly enlarged, cross-sectional view of a preferred embodiment of the apparatus.

FIG. 2 is a greatly enlarged, cross-sectional view illustrating details of the apparatus. Gravity sensitive valve 16 includes a valve housing 20 comprised of two valve housing components 22, 24 which are connected together and define a gravity sensitive valve interior 26. The valve housing components are formed of any suitable material such as polypropylene or other plastic material. The valve housing components are press fit together to provide a liquid-tight interconnection. The components may be secured together by RF welding, adhesive or other attachment means.

Gravity sensitive valve 16 includes a valve inlet 28 and a valve outlet 30. A sealing seat 32 is located at the valve outlet.

A valve member in the form of a ball 34 is located within the interior 26. The ball is formed of relatively heavy material such as stainless steel or other metal. FIG. 2 illustrates the ball 34 seated on sealing seat 32 to provide a liquid-tight seal therewith. When the gravity sensitive valve 16 is in the orientation shown in FIG. 2 with the valve inlet elevated relative to the valve outlet thereof the force of gravity will seat the ball as shown. This will prevent liquid flow from the gravity sensitive valve 16 through the valve outlet 30 to pressure activated valve 18. This is a representative position assumed by the apparatus when the pressure activated valve 18 is not in a user's mouth and the apparatus is allowed to depend downwardly from delivery tube 12.

The gravity sensitive valve 16 includes a conduit 36 which is disposed adjacent to the end of delivery tube 12. A sleeve 38 is placed about the conduit and hydration delivery tube to maintain a fluid-tight connection therebetween. This arrangement allows for maximum flow and good connection between tube 12 and conduit 36.

A sealing seat 40 is located at the valve inlet which is engageable by the valve member 34 when the apparatus is inverted from the position shown in FIG. 2 to a position wherein the valve outlet 30 is elevated relative to the valve inlet. This will prevent back flow of liquid from the gravity sensitive valve to the delivery tube 12. Each sealing seat has a tapered inner annular wall for engagement by ball 34, the angle of taper of the inner annular wall of the sealing seat 40 being greater than the angle of taper of the inner annular wall of the sealing seat 32. Sealing seat 40 is angled steeply so that the gravity valve unseats on the downstream side when the downstream end of valve 16 is lifted a short distance or through a relatively small angle.

Figure 4A:
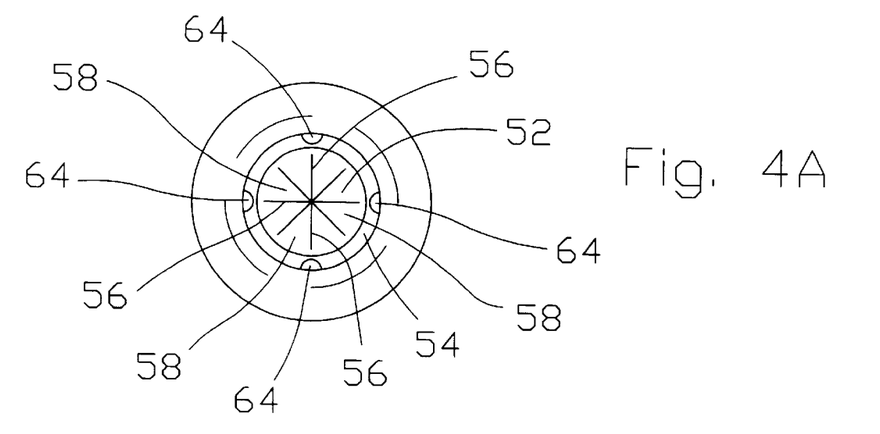
FIGS. 4A through 4C are enlarged, top plan views of a pressure activated valve employed in the apparatus, three different embodiments of the diaphragm employed therein being illustrated in these figures.
Figure 4B:
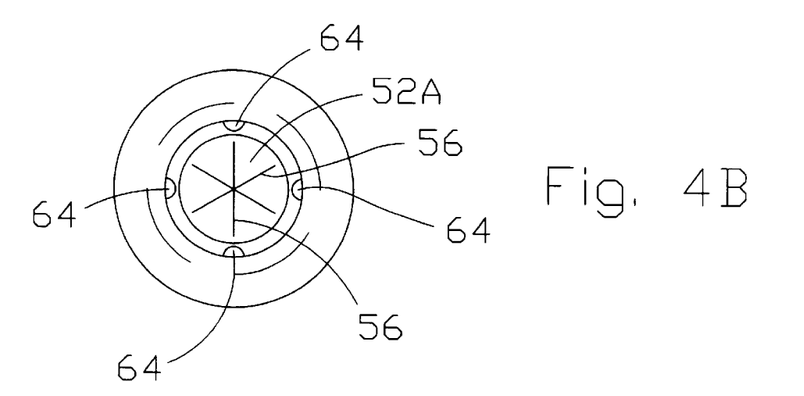
Figure 4C:
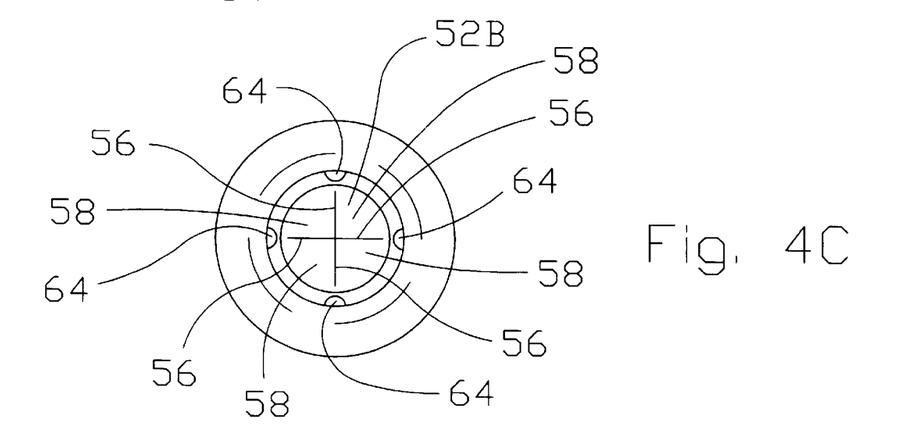

With continued reference to FIG. 2 and also to FIGS. 4A–4C, the pressure sensitive valve 18 includes a tubular housing 44 connected to the outlet or downstream end of gravity sensitive valve 16. More particularly, the gravity sensitive valve 16 includes a tubular element 46. Secured thereto by a sleeve 48 is a length of tubing 50, the tubing and the tubular element 46 being disposed end to end adjacent to one another. The other end of tubing 50 is positioned in housing 44. Length of tubing 50 may be formed of flexible or hard plastic or other material while tubular housing 44 is formed of rubber, flexible plastic or other resilient material. Tubing 50 is of a predetermined length to separate and provide spacing between the gravity sensitive valve and the pressure activated valve.

Pressure activated valve 18 also includes a deformable diaphragm 52 formed of plastic, rubber or other flexible material, the material being the same as that of the tubular housing. A wall 54 is positioned within the tubular housing and provides a hinged interconnection between the diaphragm and the tubular housing, the wall being integrally formed with the diaphragm and the tubular housing and of course constructed of the same material. The wall 54 provides a hinged interconnection between the diaphragm and the tubular housing. The wall inverts when the diaphragm moves between a first position shown in FIG. 2 to a second position (that shown in FIG. 3).

Figure 3:
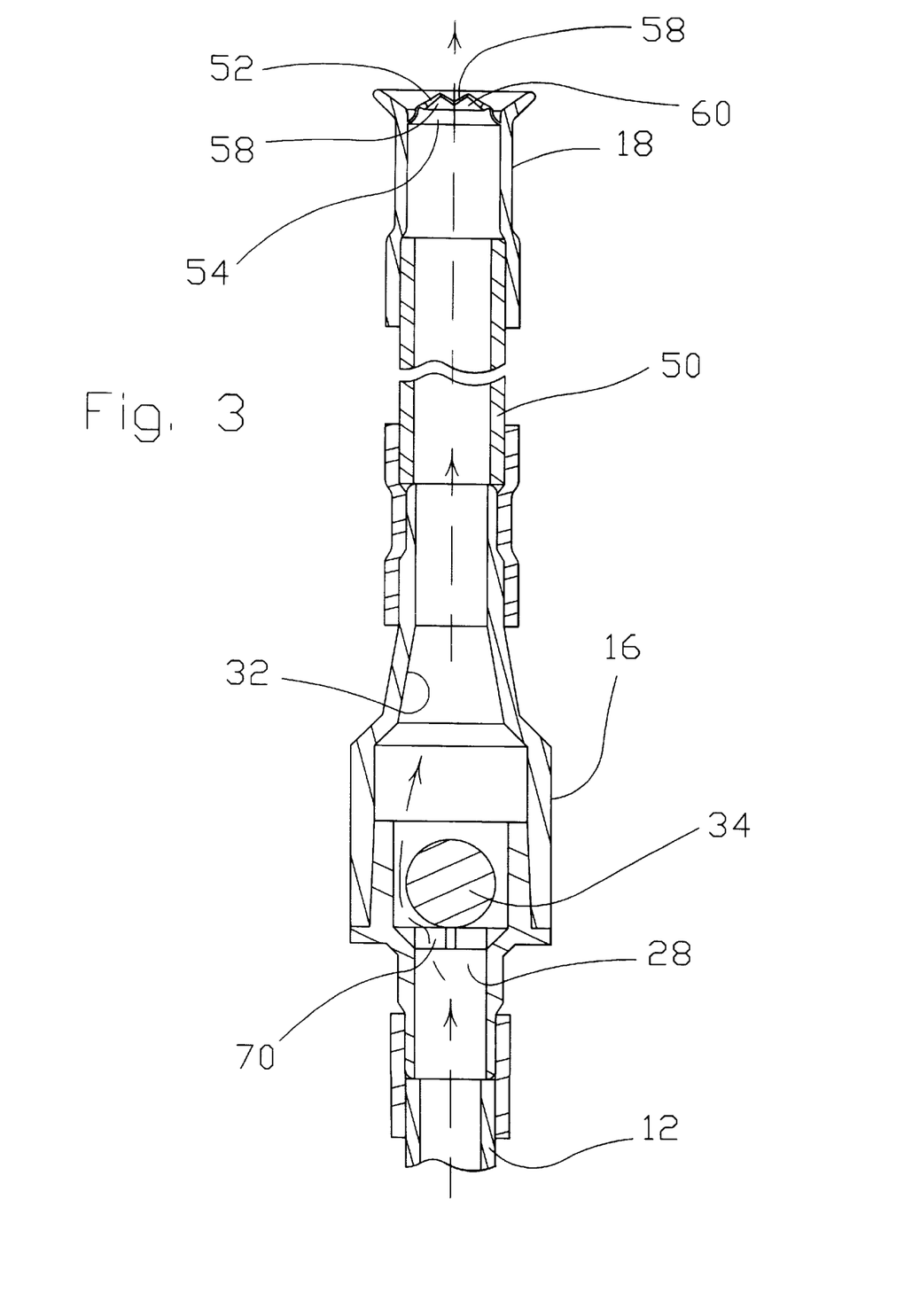
FIG. 3 is a view similar to FIG. 2, but illustrating an alternative embodiment of the apparatus.

As may perhaps best be seen with reference to FIG. 4A, the diaphragm 52 has a number of slits 56 formed therein which intersect at the center of a diaphragm to form a plurality of pie-shaped diaphragm segments 58. As can be seen in FIG. 3, these segments deflect to form an opening 60 in the diaphragm when the diaphragm is inverted and projects outwardly. This is caused by the user sucking on the end of the tubular housing 44 to draw the liquid in the apparatus outwardly and into his or her mouth. Movement of liquid in the fluid delivery system of this invention is permitted due to the fact that the gravity sensitive valve 16 is inverted so that the ball 34 is displaced from sealing seat 32. It will be appreciated that the dimensions of the valve housing 20 must be such that the force of liquid passing therethrough will be insufficient to displace the ball 34 upwardly into engagement with the sealing seat 32.

FIG. 4A illustrates eight slits 56 forming eight pie-shaped segments 58 in diaphragm 52. However, there may be lesser or greater numbers of slits and segments. For example, FIG. 4B shows a variation wherein there are six slits and six segments in diaphragm 52A. FIG. 4C illustrates another embodiment wherein the diaphragm 52B has four slits 56 and four segments 58. The greater the number of slits and segments, the larger the size of the opening that may be produced in the diaphragm when liquid is drawn therethrough.

It is desirable to automatically return the diaphragm to its initial position shown in FIG. 2 after liquid has been drawn therethrough, it being appreciated that the pie-shaped segments will then come back together and close the opening in the diaphragm.

The embodiment shown in FIG. 2 and 4A and those illustrated in FIGS. 4B and 4C incorporate detents or protrusions 64 which project inwardly from the inner wall of tubular housing 44. These protrusions will be located between wall 54 and the tubular housing 44 when the diaphragm 52 is in the position shown in FIG. 3, i.e. after the wall has been inverted from its normal position shown in FIG. 2. The protrusions are engaged by the wall to limit movement thereof and prevent the wall and diaphragm from attaining a stable inverted condition. This results in the diaphragm and wall returning to the positions shown in FIG. 2 after the user has stopped sucking liquid.

The length of tubing 50 must be such that it is short enough to prevent the standing head of liquid between the valves 16 and 18 from opening or inverting the diaphragm when the gravity sensitive valve is elevated relative to the pressure activated valve as shown in FIG. 2, for example. On the other hand, the length of tubing must be long enough to significantly separate the gravity sensitive valve 16 from the pressure activated valve 18. Proper separation will allow the user to have his or her head and mouth at almost any angle or altitude relative to the gravity sensitive valve and still allow the ball 34 to disengage from sealing seat 32 at the downstream end of the valve housing 20.

Tubular housing 44 has an outwardly flared distal end 68 which will serve to keep the tubular housing positioned in an individual's mouth when in use. It also acts as a jam to prevent the valve 18 from being sucked into the user's mouth during a drink. FIG. 3, as indicated above, illustrates the apparatus with the pressure activated valve 18 disposed above gravity sensitive valve 16. In this orientation the ball 34 has fallen away from sealing seat 32 to permit the flow of liquid through the valve. In FIG. 3 liquid flow is indicated by dash lines.

The embodiment of FIG. 3 differs from that of FIG. 2 in that a sealing seat is not formed at the valve inlet 28. Instead, a ball support 70 is provided. Ball support 70 has holes formed therein, i.e. is porous, so that back flow of liquid into the delivery tube 12 is permitted. In addition, the embodiment of FIG. 3 does not incorporate protrusions such as protrusions 64 of the FIG. 2 embodiment. If the diaphragm 52 does not return to its closed condition after use the user can engage the diaphragm with his or her tongue to push it back into place to provide a liquid-tight seal.

Figure 5:
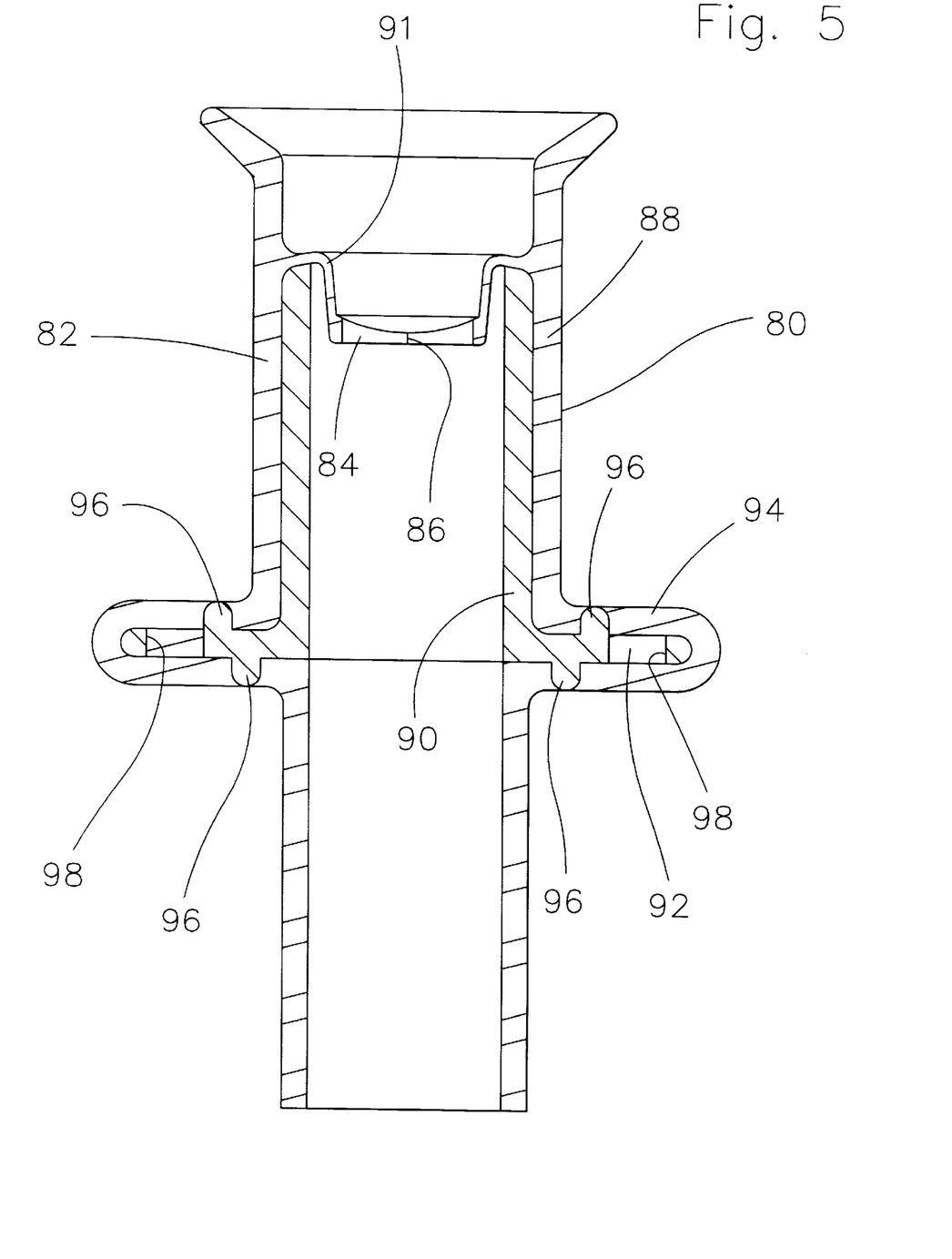
FIG. 5 is a greatly enlarged, cross-sectional view of an alternative embodiment of the pressure activated valve employed in the apparatus.
Figure 6A:
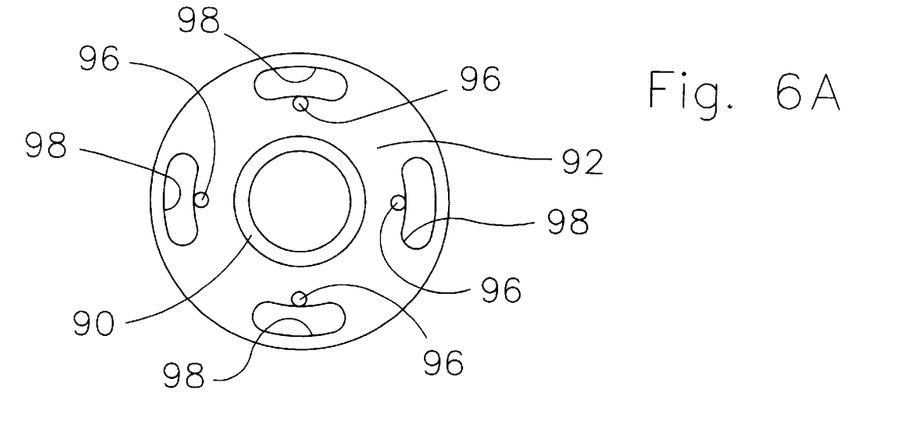
FIG. 6A is a top plan view of a stiffener insert employed in the embodiment of FIG. 5.
Figure 6B:
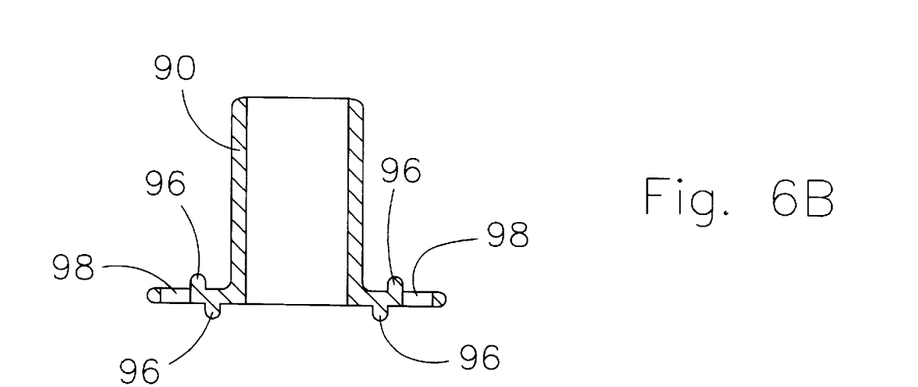
FIG. 6B is a cross-sectional, side view of the stiffener insert.
Figure 6C:
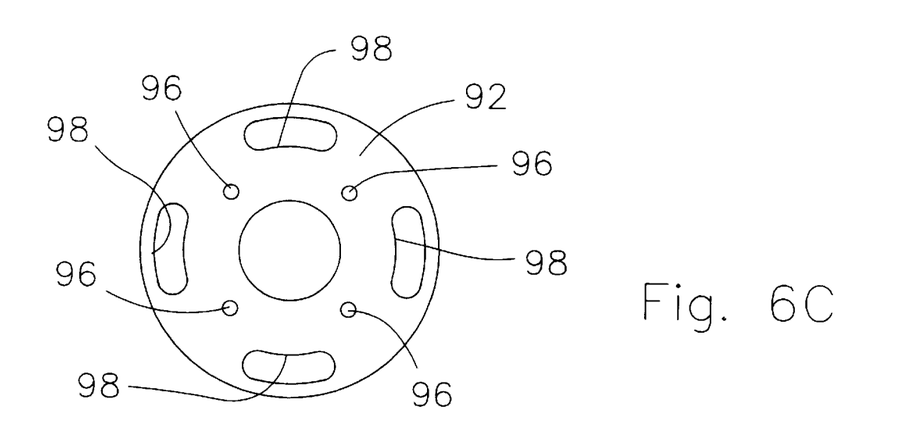
FIG. 6C is a bottom view of the stiffener insert.

Referring now to FIGS. 5 through 6C, an alternative embodiment of pressure activated valve, valve 80, is shown. Valve 80 includes a valve housing 82 and a invertible diaphragm 84 having one or more slits 86 formed therein.

Tubular housing 82 includes an outer tubular housing member 88 and an inner tubular housing member 90. The outer tubular housing member is formed of flexible, resilient material such as plastic or rubber and the inner tubular housing member is formed of inflexible, hard material, such as plastic or metal. The inner tubular housing member 90 is positioned within the outer tubular housing member 88 to support and stiffen the outer tubular housing member. This prevents the diaphragm from being crushed in the user's mouth. If the diaphragm is crushed it might not invert properly. Furthermore, inner tubular housing member 90 prevents the valve from being crushed when the valve and its associated hydration system components are stored, thus preventing inadvertent leakage.

Diaphragm 84 and outer tubular housing member 88 along with wall 91 interconnecting same are integrally molded. The housing members 88, 90 are secured together during a molding process wherein the housing member 88 is molded in situ on housing member 90.

The housing members are attached together at a rigid flange 92 projecting from inner tubular housing member 90. The outer tubular housing member 88 has a radially extending portion 94 defining a circular recess accommodating the rigid flange, the portion 94 covering the flange.

Protrusions 96 project from the rigid flange into portion 94. The flange 92 defines openings 98 accommodating the material of the outer tubular housing member which flowed into the openings during the molding process.

The radial hinge wall 91 hingedly interconnects outer tubular housing member 88 and the diaphragm, the wall engaging an end of the inner tubular housing member or stiffener 90. Thus, the top edge of the housing member 90 can act as part of the molding surface for the hinge. The protrusions 96 can be utilized to clamp the inner tubular housing member 90 inside a mold employed to form the outer tubular housing member, the diaphragm and the hinge wall.

What is claimed is:

1. Apparatus for controlling the flow of fluid, said apparatus comprising, in combination:

fluid flow passageway defining means defining a fluid flow passageway having an inlet and an outlet, said inlet and said said outlet being spaced from one another;

a gravity sensitive valve located between said inlet and said outlet for controlling flow of fluid through said fluid flow passageway, said gravity sensitive valve including a valve housing defining a valve housing interior, a valve inlet in communication with said valve housing interior, a valve outlet spaced from said valve inlet and in communication with said valve housing interior, a sealing seat at said valve outlet and a valve member moveable within said valve housing interior between said valve inlet and said valve outlet and sufficiently heavy to prevent buoying of the valve member by fluid in said housing interior, said valve housing surrounding said valve member between said valve inlet and said valve outlet for retaining fluid in said valve housing interior, and said valve member responsive to positioning of said gravity sensitive valve with the valve inlet thereof disposed at a higher elevation than the valve outlet thereof to move to said sealing seat under the influence of gravity and seat in said sealing seat to prevent fluid flow from said gravity sensitive valve through said valve outlet of fluid disposed in said valve housing interior above the valve member; and a pressure activated valve connected to said fluid flow passageway defining means spaced from said gravity sensitive valve.

2. The apparatus according to claim 1 additionally comprising a porous valve seat at said valve inlet.

3. The apparatus according to claim 1 wherein said fluid flow passageway defining means includes length of tubing disposed between said gravity sensitive valve and said pressure activated valve.

4. The apparatus according to claim 3 wherein said gravity sensitive valve includes a tubular element extending outwardly from the location of said sealing seat, said tubular element and said length of tubing disposed adjacent to one another, said apparatus additionally comprising a sleeve positioned about the tubular element and length of tubing to maintain a fluid-tight connection between said tubular element and said length of tubing.

5. The apparatus according to claim 1 wherein said fluid flow passageway includes a flexible hydration delivery tube connected to said gravity sensitive valve for delivering a liquid to said valve inlet from a hydration reservoir and wherein said gravity sensitive valve includes a conduit defining said valve inlet, said hydration delivery tube and said conduit disposed adjacent to one another, said apparatus additionally comprising a sleeve positioned about the conduit and hydration delivery tube to maintain a fluid-tight connection between said conduit and said hydration delivery tube.

6. The apparatus according to claim 1 wherein said valve housing is comprised of two valve housing components connected together, said valve inlet being defined by one of said housing components and said valve outlet being defined by the other of said housing components.

7. The apparatus according to claim 1 wherein said pressure activated valve includes a tubular housing connected to said fluid flow passageway defining means at said outlet thereof and a deformable diaphragm connected to said tubular housing, said diaphragm movable between a first position wherein said diaphragm is closed and forms a substantially fluid-tight seal and a second position wherein said diaphragm defines an opening allowing for the passage of fluid therethrough.

8. The apparatus according to claim 7 wherein said tubular housing has an outwardly flared distal end positionable in an individual's mouth.

9. The apparatus according to claim 7 including means urging said diaphragm from said second position to said first position.

10. The apparatus according to claim 9 wherein said pressure activated valve additionally includes a wall positioned within said tubular housing and providing a hinged interconnection between said diaphragm and said tubular housing, said wall inverting when said diaphragm moves between said first and second positions, said means urging said diaphragm from said second position to said first position comprising at least one detent located between said wall and said tubular housing when said diaphragm is in said second position to limit movement of said wall and prevent the wall and diaphragm from attaining a stable inverted condition when said diaphragm is in said second position.

11. The apparatus according to claim 10 wherein a plurality of spaced detents are located between said wall and said tubular housing when said diaphragm is in said second position.

12. The apparatus according to claim 7 wherein a plurality of slits are formed in said diaphragm, said slits intersecting at the center of said diaphragm to form a plurality of pie-shaped diaphragm segments which deflect to form said opening when said diaphragm is in said second position under the urging of pressurized fluid in said tubular housing.

13. The apparatus according to claim 7 wherein said tubular housing includes an outer tubular housing member and an inner tubular housing member, said outer tubular housing member being formed of flexible, resilient material and said inner tubular housing member being formed of inflexible, hard material, said inner tubular housing member being positioned within said outer tubular housing member to support and stiffen said outer tubular housing member.

14. The apparatus according to claim 13 wherein said diaphragm is integral with said outer tubular housing member.

15. The apparatus according to claim 14 wherein said pressure activated valve additionally includes a radial hinge hingedly interconnecting said diaphragm and said tubular housing, said radial hinge being integral with and disposed between said diaphragm and said outer tubular housing member.

16. The apparatus according to claim 15 wherein said radial hinge engages an end of said inner tubular housing member and wherein said diaphragm is within the confines of said inner tubular housing when in said first position and is disposed externally of said inner tubular housing member when in said second position.

17. The apparatus according to claim 13 additionally comprising attachment means fixedly attaching said inner tubular housing member to said outer tubular housing member.

18. The apparatus according to claim 17 wherein said attachment means includes a rigid flange projecting outwardly from said inner tubular housing member, said outer tubular housing member having a radially extending portion defining a circular recess accommodating said rigid flange, said radially extending portion covering said flange.

19. The apparatus according to claim 18 additionally comprising mold guide protrusions projecting from said rigid flange into said radially extending position of said outer tubular housing member, said outer tubular housing member molded in situ on said inner tubular housing member and flange.

20. The apparatus according to claim 19 wherein said flange defines openings accommodating molded material of said outer tubular housing member.

21. Apparatus for controlling the flow of fluid through a fluid flow passageway, said apparatus comprising a pressure activated valve for receiving fluid from a fluid flow passageway and including a tubular housing member formed a resilient molded material and a deformable diaphragm formed of resilient molded material integrally connected to said tubular housing member and movable between a first position wherein said diaphragm is closed and forms a substantially fluid-tight seal preventing fluid flow through said tubular housing member and a second position wherein said diaphragm defines an opening responsive to fluid pressure within said tubular housing member, said pressure activated valve additionally including a wall providing a hinged interconnection between said tubular housing member and said diaphragm and integral with said tubular housing member and said diaphragm, said wall inverting when said diaphragm moves between said first and second position.

22. Apparatus for controlling the flow of fluid, said apparatus comprising, in combination:
  fluid flow passageway defining means defining a fluid flow passageway having an inlet and an outlet, said inlet and said outlet being spaced from one another;
  a gravity sensitive valve located between said inlet and said outlet for controlling flow of fluid through said fluid flow passageway, said gravity sensitive valve including a valve inlet, a valve outlet, a sealing seat at said valve outlet and a valve member moveable between said valve inlet and said valve outlet and responsive to positioning of said gravity sensitive valve with the valve inlet thereof disposed at a higher elevation than the valve outlet thereof to seat in said sealing seat and prevent fluid flow from said gravity sensitive valve through said valve outlet;
  a pressure activated valve connected to said fluid flow passageway defining means spaced from said gravity sensitive valve; and
  a sealing seat at said valve inlet engageable by said valve member when said valve outlet is elevated relative to said valve inlet.

23. The apparatus according to claim 22 wherein said valve member comprises a ball and wherein each said sealing seat has a tapered inner annular wall for engagement by said ball, the angle of taper of the inner annular wall of the sealing seat at said valve inlet being greater than the angle of taper of the inner annular wall of the sealing seat at said valve outlet.

24. Apparatus for controlling the flow of fluid through a fluid flow passageway, said apparatus comprising a pressure activated valve for receiving fluid from a fluid flow passageway and including a tubular housing member formed of resilient molded material integrally connected to said tubular housing member and movable between a first position wherein said diaphragm is closed and forms a substantially fluid-tight seal preventing fluid flow through said tubular housing member and a second position wherein said diaphragm defines an opening responsive to fluid pressure within said tubular housing member, and a tubular stiffening member positioned within said tubular housing member to provide support for and stiffen said tubular housing member and to prevent collapse of said diaphragm due to opposed forces applied to said tubular housing member.

25. The apparatus according to claim 1 wherein said pressure activated valve is an orally actuated valve.

26. Apparatus for controlling the flow of fluid through a fluid flow passageway, said apparatus comprising a pressure activated valve for receiving fluid from the fluid flow passageway and including a tubular housing member and a deformable diaphragm formed of resilient material connected to said tubular housing member and moveable responsive to a change of fluid pressure at said diaphragm between a first position wherein said diaphragm is closed and forms a substantially fluid-tight seal preventing fluid flow through said tubular housing member and a second position wherein said diaphragm defines an opening, said pressure activated valve additionally including a wall surrounding said diaphragm providing a hinged interconnection between said tubular housing member and said diaphragm, said wall inverting when said diaphragm moves between said first and second position responsive to a change of fluid pressure at said diaphragm.

27. The apparatus according to claim 26 wherein said fluid flow passageway includes a hydration delivery tube, said tubular housing member being connected to said hydration delivery tube and cooperable therewith to deliver a liquid to said pressure activated valve from a source of liquid.

28. The apparatus according to claim 26 additionally comprising a tubular stiffening member disposed about said tubular housing member to provide support for and stiffen said tubular housing member and to prevent collapse of said diaphragm when opposed forces are applied to said tubular housing member.

* * * * *